United States Patent
Dalal

(10) Patent No.: US 11,080,209 B2
(45) Date of Patent: Aug. 3, 2021

(54) SERVER SYSTEMS AND METHODS FOR DECRYPTING DATA PACKETS WITH COMPUTATION MODULES INSERTABLE INTO SERVERS THAT OPERATE INDEPENDENT OF SERVER PROCESSORS

(71) Applicant: Xockets, Inc., San Jose, CA (US)

(72) Inventor: Parin Bhadrik Dalal, Milpitas, CA (US)

(73) Assignee: Xockets, Inc., San Jose, CA (US)

( * ) Notice: Subject to any disclaimer, the term of this patent is extended or adjusted under 35 U.S.C. 154(b) by 147 days.

(21) Appl. No.: 15/396,334

(22) Filed: Dec. 30, 2016

(65) Prior Publication Data

US 2017/0237714 A1    Aug. 17, 2017

Related U.S. Application Data

(63) Continuation of application No. 13/900,346, filed on May 22, 2013, now Pat. No. 9,665,503.

(Continued)

(51) Int. Cl.
*G06F 21/00* (2013.01)
*G06F 13/16* (2006.01)
(Continued)

(52) U.S. Cl.
CPC .......... *G06F 13/16* (2013.01); *G06F 13/1652* (2013.01); *G06F 13/4282* (2013.01);
(Continued)

(58) Field of Classification Search
CPC .. G06F 13/16; G06F 13/4282; G06F 13/1652; G06F 17/30424; G06F 12/1018; G06F 21/55; G06F 17/3061; G06F 9/5066; G06F 12/1081; G06F 16/30; G06F 16/245; H04L 41/12; H04L 49/70; H04L 63/168; H04L 63/14; H04L 63/0428; H04L 63/0281; H04L 63/0272; H04L 67/10; H04L 63/0227; Y02D 10/151; Y02D 10/13; Y02D 10/22; Y02D 10/36; Y02D 10/14; Y02D 10/00

See application file for complete search history.

(56) References Cited

U.S. PATENT DOCUMENTS 4,894,768 A    1/1990 Iwasaki et al.
6,157,955 A    12/2000 Narad et al.
(Continued)

OTHER PUBLICATIONS

WIPO, Written Opinion of the International Searching Authority for PCT Application PCT/US2015/023746, dated Sep. 15, 2015.

(Continued)

*Primary Examiner* — Kendall Dolly

(57) ABSTRACT

A server system can include a plurality of servers interconnected by a network. Each server can include a server processor, a socket configured to receive a module, and at least one removable computation module configured for insertion into the socket. Each computation module can include first processing circuits mounted on the computation module and configured to at least decrypt data packets received by the server independent of the server processor and second processing circuits mounted on the computation module and configured to form a virtual switch for switching the data packets.

20 Claims, 3 Drawing Sheets

Related U.S. Application Data

(60) Provisional application No. 61/650,373, filed on May 22, 2012.

(51) Int. Cl.

| | | |
|---|---|---|
| *H04L 12/24* | (2006.01) | |
| *H04L 12/931* | (2013.01) | |
| *G06F 13/42* | (2006.01) | |
| *H04L 29/06* | (2006.01) | |
| *G06F 21/55* | (2013.01) | |
| *H04L 29/08* | (2006.01) | |
| *G06F 12/1018* | (2016.01) | |
| *G06F 16/30* | (2019.01) | |
| *G06F 16/245* | (2019.01) | |
| *G06F 12/1081* | (2016.01) | |

(52) U.S. Cl.
CPC .............. *H04L 41/12* (2013.01); *H04L 49/70* (2013.01); *H04L 63/0272* (2013.01); *H04L 63/0281* (2013.01); *H04L 63/0428* (2013.01); *H04L 63/14* (2013.01); *H04L 63/168* (2013.01); *G06F 12/1018* (2013.01); *G06F 12/1081* (2013.01); *G06F 16/245* (2019.01); *G06F 16/30* (2019.01); *G06F 21/55* (2013.01); *H04L 63/0227* (2013.01); *H04L 67/10* (2013.01); *Y02D 10/00* (2018.01)

(56) References Cited

U.S. PATENT DOCUMENTS

| | | | |
|---|---|---|---|
| 6,446,163 B1 | 9/2002 | Hazelzet et al. | |
| 7,436,845 B1 | 10/2008 | Rygh et al. | |
| 8,072,887 B1 | 12/2011 | Siva et al. | |
| 8,149,834 B1 | 4/2012 | Nielsen et al. | |
| 8,635,417 B2 | 1/2014 | Morrison et al. | |
| 8,825,900 B1 | 9/2014 | Gross, IV et al. | |
| 8,885,334 B1* | 11/2014 | Baxter ................ | G06F 13/1684 361/679.32 |
| 8,924,606 B2 | 12/2014 | Akiyama et al. | |
| 8,990,799 B1 | 3/2015 | Forecast | |
| 9,250,954 B2 | 2/2016 | Dalal et al. | |
| 9,258,276 B2 | 2/2016 | Dalal | |
| 9,286,472 B2 | 3/2016 | Dalal et al. | |
| 9,288,101 B1 | 3/2016 | Dalal et al. | |
| 9,348,638 B2 | 5/2016 | Dalal et al. | |
| 9,378,161 B1 | 6/2016 | Dalal et al. | |
| 9,436,638 B1 | 9/2016 | Dalal et al. | |
| 9,436,639 B1 | 9/2016 | Dalal et al. | |
| 9,436,640 B1 | 9/2016 | Dalal et al. | |
| 9,460,031 B1 | 10/2016 | Dalal et al. | |
| 9,495,308 B2 | 11/2016 | Dalal | |
| 9,558,351 B2 | 1/2017 | Dalal et al. | |
| 9,619,406 B2 | 4/2017 | Dalal | |
| 9,665,503 B2 | 5/2017 | Dalal | |
| 2004/0010712 A1* | 1/2004 | Hui ..................... | H04L 63/0227 726/15 |
| 2004/0024915 A1* | 2/2004 | Abe ....................... | H04L 29/06 709/250 |
| 2004/0133720 A1 | 7/2004 | Slupsky | |
| 2004/0187122 A1 | 9/2004 | Gosalia et al. | |
| 2004/0202319 A1* | 10/2004 | Hussain .............. | H04L 63/0428 380/33 |
| 2005/0038946 A1 | 2/2005 | Borden | |
| 2005/0226238 A1 | 10/2005 | Hoskote et al. | |
| 2007/0016906 A1 | 1/2007 | Trauben et al. | |
| 2007/0079185 A1 | 4/2007 | Tololos, Jr. | |
| 2007/0097130 A1 | 5/2007 | Margulis | |
| 2007/0115983 A1 | 5/2007 | Yadlon et al. | |
| 2007/0294433 A1 | 12/2007 | Leigh | |
| 2008/0027920 A1 | 1/2008 | Schipunov et al. | |
| 2008/0304481 A1 | 12/2008 | Gurney et al. | |
| 2009/0254719 A1 | 10/2009 | Sasage | |
| 2010/0031235 A1 | 2/2010 | Adams et al. | |
| 2010/0232548 A1 | 9/2010 | Bolan et al. | |
| 2010/0312913 A1 | 12/2010 | Wittenschlaeger | |
| 2011/0035540 A1 | 2/2011 | Fitzgerald et al. | |
| 2011/0099317 A1 | 4/2011 | Nishtala et al. | |
| 2011/0103259 A1* | 5/2011 | Aybay .................. | H04L 45/306 370/254 |
| 2012/0047126 A1 | 2/2012 | Branscome et al. | |
| 2012/0076006 A1 | 3/2012 | DeCusatis | |
| 2012/0096211 A1 | 4/2012 | Davis et al. | |
| 2012/0131306 A1 | 5/2012 | Bratt et al. | |
| 2012/0250682 A1 | 10/2012 | Vincent et al. | |
| 2013/0031390 A1 | 1/2013 | Smith, III et al. | |
| 2013/0179435 A1 | 6/2013 | Stadter | |
| 2013/0219168 A1 | 8/2013 | Gearhart et al. | |
| 2013/0290462 A1 | 10/2013 | Lim et al. | |
| 2014/0115282 A1 | 4/2014 | Natkovich et al. | |
| 2014/0157287 A1 | 6/2014 | Howes et al. | |
| 2014/0181319 A1 | 6/2014 | Chen et al. | |
| 2014/0204099 A1 | 6/2014 | Ye | |
| 2014/0201314 A1 | 7/2014 | Borkenhagen | |
| 2016/0306667 A1 | 10/2016 | Burger et al. | |

OTHER PUBLICATIONS

WIPO, International Search Report for PCT Application PCT/US2015/023746, dated Sep. 15, 2015.
WIPO, Written Opinion of the International Searching Authority for PCT Application PCT/US2015/023730, dated Jul. 23, 2015.
WIPO, International Search Report for PCT Application PCT/US2015/023730, dated Jul. 23, 2015.
Miyashiro et al., DIMMNET-2: A Reconfigurable Board Connected to a Memory Slot, International Conference on Field Programmable Logic and Applications, 2006, Aug. 28-30, 2006, Madrid, Spain.
Tanabe et al., Preliminary Evaluations of a FPGA-based-Prototype of DIMMnet-2 Network Interface, Proceedings of the Innovative Architecture for Future Generation High-Performance Processors and Systems (IWIA '05), 2005.
Plessl et al., TKDM—A Reconfigurable Co-processor in a PC's Memory Slot, IEEE International Conference on Field-Programmable Technology (FPT), 2003, Dec. 17, 2003, Tokyo, Japan.
Tanabe et al., Prototyping on Using a DIMM Slot as a High-Performance I/O Interface, Proceedings of the Innovative Architecture for Future Generation High-Performance Processors and Systems (IWIA '03), 2003.
Tong et al., A System Level Implementation of Rijndael on a Memory-slot based FPGA Card, IEEE International Conference on Field-Programmable Technology (FPT), 2002, Dec. 16-18, 2002, Hong Kong, China.
Leong et al., Pilchard—A Reconfigurable Computing Platform with Memory Slot Interface, Proceedings of the 9th Annual IEEE Symposium on Field-Programmable Custom Computing Machines (FCCM '01), 2001.

* cited by examiner

| Systems | x86 | ARM | DIMMs | NICs |
|---|---|---|---|---|
| Xockets MAX 1U | 2x Opteron 4256 EE, 1.8GhZ/8MB | 80x A9, 800MHz, 1MB | 8 x 8GB | 4 x 40 Gbps |
| Xockets MIN 1U | 2x Opteron 4256 EE, 1.8GhZ/8MB | 20x A9, 800MHz, 1MB | 14 x 8GB | 2 x 10 Gbps |
| Reference 1U | 2x Xeon E31280, 3.3GhZ/8MB | | 18 x 8GB | 2 x 10 Gbps |
| Xockets MAX 2U | 4x Opteron 4256 EE, 1.8GhZ/8MB | 160x A9, 800MHz, 1MB | 16 x 8GB | 4 x 80 Gbps |
| Reference 2U | 4x Xeon E31280, 3.3GhZ/8MB | | 32 x 8GB | 4 x 20 Gbps |

FIG. 4-3

| Component | Av. Power (W) | Max. Power (W) | Qty. | Av. Total (W) | Total (W) |
|---|---|---|---|---|---|
| RLDRAM3, 667 MHz 576MB | 0.7 | 1.2 | 4 | 2.8 | 4.8 |
| Zynq 7020 800 MHz | 1.5 | 2.5 | 4 | 6 | 10 |
| Zynq 7020 800 MHz (arb) | 1.3 | 2.1 | 1 | 1.3 | 2.1 |
| Inphi iMB2 | 0.8 | 1.2 | 1 | 0.8 | 2.9 |
| Other | | | | 2.9 | 2.1 |
| Total Power Budget at maximum 24 Gbps ingress and 24 Gbps egress per DIMM | | | | 13.8 | 21 |

FIG. 4-4

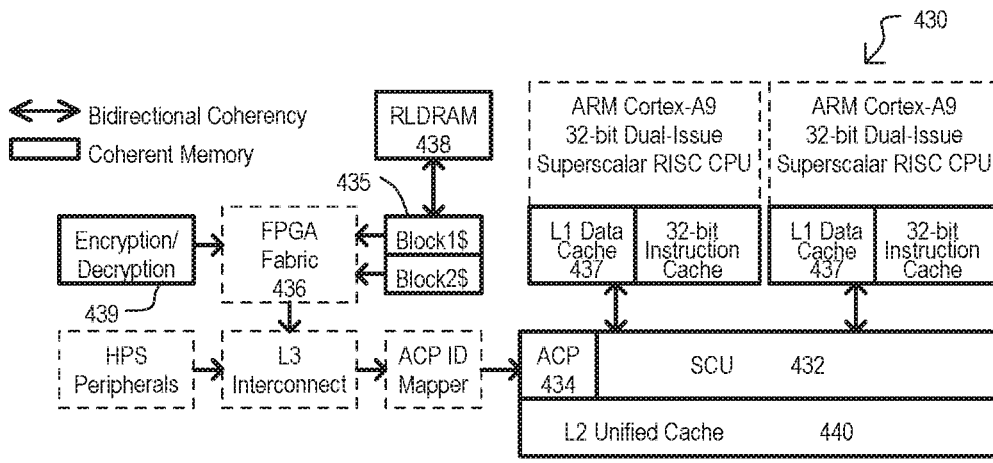

FIG. 4-5

SERVER SYSTEMS AND METHODS FOR DECRYPTING DATA PACKETS WITH COMPUTATION MODULES INSERTABLE INTO SERVERS THAT OPERATE INDEPENDENT OF SERVER PROCESSORS

PRIORITY CLAIMS

This application is a continuation of U.S. patent application Ser. No. 13/900,346 filed May 22, 2013, which claims the benefit of U.S. Provisional Patent Application 61/650,373 filed May 22, 2012, the contents all of which are incorporated by reference herein.

TECHNICAL FIELD

The present disclosure relates generally to server systems and methods for decrypting data packets, and more particularly to systems that include computation modules that can be inserted into sockets of servers for executing decryption and other packet processing operations independent of processors of the servers.

BACKGROUND

Packet handling and security applications can require a significant amount of scarce computational resources in enterprise server or cloud based data systems. These can include services such as packet repeaters, intrusion detection systems (IDS), intrusion protection systems (IPS), and routing mechanisms for virtual private networks (VPNs). Many proprietary and incompatible hardware systems are available for such packet handling and transport services, but cost and a desire for standardization pushes enterprise data storage and processing providers toward software defined stacks running on commodity (e.g., x86 architecture) hardware.

Unfortunately, processors based on x86 architectures are ill-equipped to handle such high volume applications. Even idling, x86 processors use a significant amount of power, and near continuous operation for high bandwidth packet analysis functionality make the processor energy costs one of the dominate price factors. In addition, issues with the high cost of context switching, the limited parallelism, and the security implications associated with running encryption/decryption modules on x86 processors have reduced the effectiveness of enterprise or cloud data security.

BRIEF DESCRIPTION OF THE DRAWINGS

FIG. 3-1 illustrates an embodiment with software stacks respectively running on a XIMM module and an x86-based server processor.

FIG. 3-2 illustrates an embodiment with software stacks described in FIG. 3-1 operating in the context of two servers communicating over an Ethernet-type connection FIG. 4-1 shows a cartoon schematically illustrating a data processing system according to an embodiment, including a removable computation module for offload of data processing.

FIG. 4-2 shows an example layout of a XIMM module according to an embodiment.

FIG. 4-3 shows two possible architectures for a XIMM module in a simulation (Xockets MAX and MIN).

FIG. 4-4 shows a representative the power budget for an example of a Xockets XIMM.

FIG. 4-5 illustrates data flow operations of one embodiment using an ARM A9 architecture according to an embodiment.

DETAILED DESCRIPTION

Packet handling and security applications for enterprise server or cloud based data systems can be efficiently implemented on offload processing modules connected to a memory bus, for example, by insertion into a socket for a Dual In-line Memory Module (DIMM). Such modules can be referred to as Xocket™ In-line Memory Modules (XIMMs), and can have multiple "wimpy" cores associated with a memory channel. Using one or more XIMMs it is possible to execute lightweight packet handling tasks without intervention from a main server processor. As will be discussed, XIMM modules can have high efficiency context switching, high parallelism, and can solve security problems associated with running encryption/decryption modules on x86 processors. Such systems as a whole are able to handle high network bandwidth traffic at a lower latency and at a very low power when compared to traditional high power 'brawny' server cores. XIMMs can provide services such as firewall packet repeaters, intrusion detection systems (IDS), intrusion protection systems (IPS), and routing mechanisms for virtual private networks with low power costs and high reliability.

Figure 1:
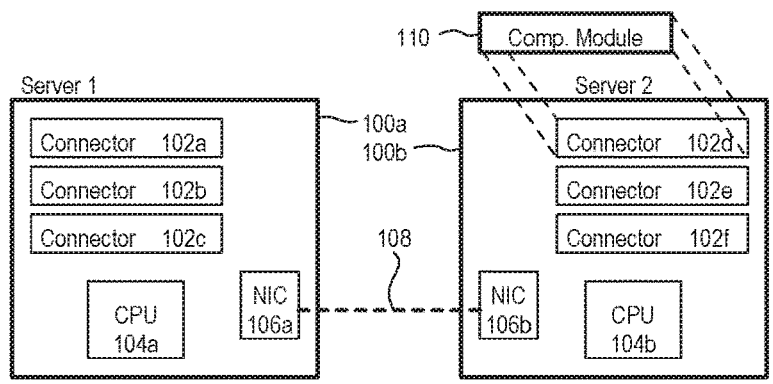
FIG. 1 shows an embodiment with two computers which can be rack servers connected over a network interface such as an Ethernet-type interface.

FIG. 1 illustrates an embodiment with two computers which can be rack servers (100a, 100b) connected over a network interface such as Ethernet (108). It is seen that both contain a central processing unit (104a, 104b), a network interface controller (106a, 106b) and a number of connectors (102a, 102b, 102c, 102d, 102e, 102f) which can be dual-inline memory module (DIMM) connectors. It is further seen that the second server (100b) has a removable computation module (110) which can be inserted into one of the connector slots (102d). In an example, this computation module is a XIMM. Packets can be sent bi-directionally between the two servers, through the shown NICs and over the connection (108), and a variety of offload packet handling services can be performed by the XIMM in the second server, including but not limited to virtual private network (VPN) tunneling and signature detection and packet filtering as an intrusion prevention system (IPS).

Figure 2:
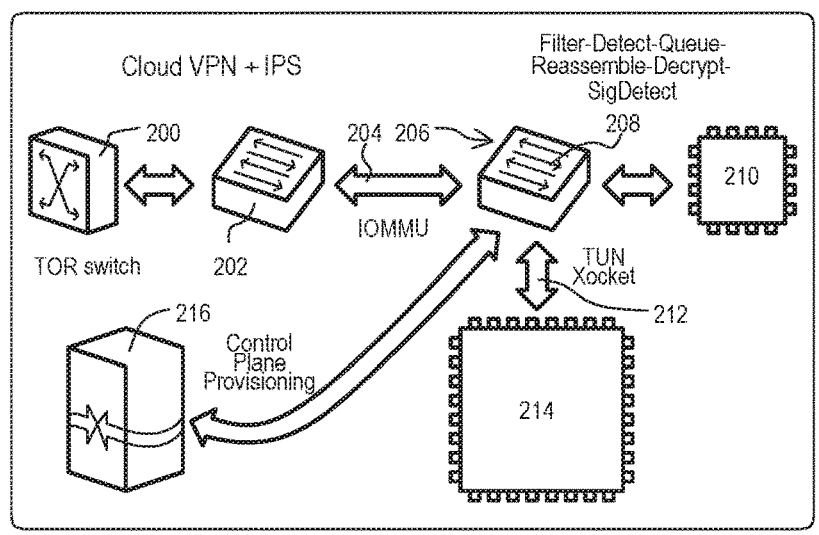
FIG. 2 shows module according to an embodiment (referred to as a XIMM module) in more detail acting as a part of the second server.

FIG. 2 shows a different view of the XIMM module in the context of the second server shown above in FIG. 1. Network packets flow from a top-of-rack (TOR) switch (200) to the server, where a first virtual switch (202), in this case a network interface card with single root 10 virtualization (SR-IOV), receives the packets and determines which XIMM module (206) to send them to. The packet is passed to the XIMM by way of an input-out memory management unit (IOMMU 204). On the XIMM 206, a first of a number of offload processors can act as a virtual switch (208).

The virtual switch 208 can be created with virtual switching software such as OpenFlow. OpenFlow is an open standard network protocol used to manage traffic between commercial Ethernet switches, routers and wireless access points. OpenFlow enables software-defined networking (SDN) for programmable networks and typically emulates a hardware Ethernet switch. Using a configurable data flow table it is possible to connect multiple switches and/or networks together to create a data flow, and then flexibly managing the entire infrastructure, setting policies and managing traffic type as needed. It allows for deployment of innovative routing and switching protocols in a network for many different applications, including virtual machine and high-security networks. The software stack running on a processor of the server also provides control plane provisioning (216) which includes a variety of packet handling services including but not limited to virtual private network (VPN) encryption/decryption through an open source technology such as OpenVPN, as but one example. Upon receipt, a decrypted packet is arbitrated by said processor acting as a switch to a second of a plurality of other offload processors (210). The second offload processor 210 can be running an operating system such as Apache, and may utilize a software stack for packet handling services. It reassembles decrypted packet data and performs intrusion prevention systems (IPS) signature detection in order to detect malicious incoming packet traffic. Optionally, a connection can also be established between the XIMM 206 and another server processor (e.g., a x86 processor) (214) through a high speed bus. Packets may be sent to the x86 processor 214 via a bus, including but limited to memory busses such as a double data rate (DDR, DDR2, DDR3, DDR4) bus. In this example, an Ethernet tunnel (212) exists over a DDR bus between the XIMM and the server's x86 processor (214) for the transmission of packets or other information between the two.

Advantageously, such a system can greatly improve computational and power efficiency for management of simultaneously running IPS and VPN services. Traditionally, IPS protocols require the assembly of data for signature detection before traffic is allowed to access a server, but VPN protocols mandate decryption on the server to produce signature detection data. In practice, many cloud service providers are forced to use proprietary hardware or simply disallow IPS services to a server core (limiting IPS to between an enterprise router and a gateway). Use of XIMMs allows the problems associated with simultaneous IPS and VPN to be avoided, since signature detection can occur on the XIMM (for example, with the aid of Advanced Encryption Standard (AES) cores implementable on FPGA cores in a XIMM), while VPN interconnection is maintained.

Figures 1, 3:
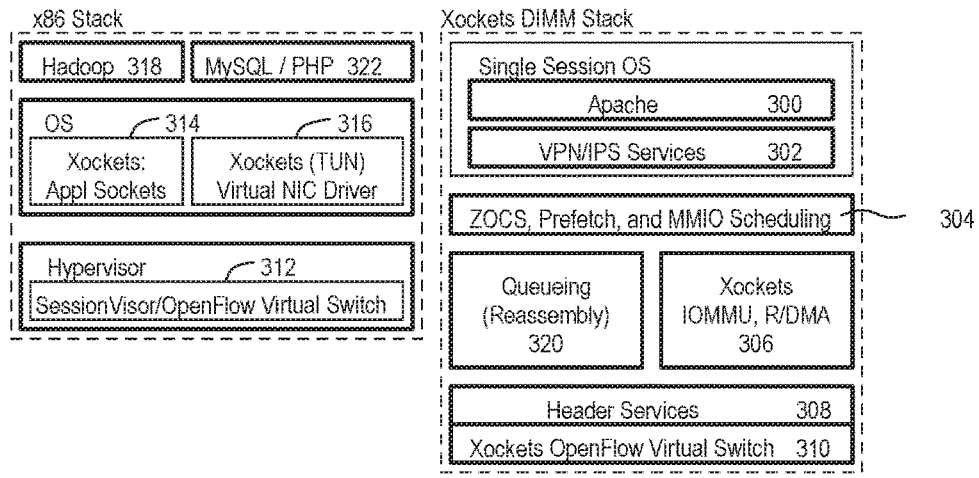
Figures 2, 3:
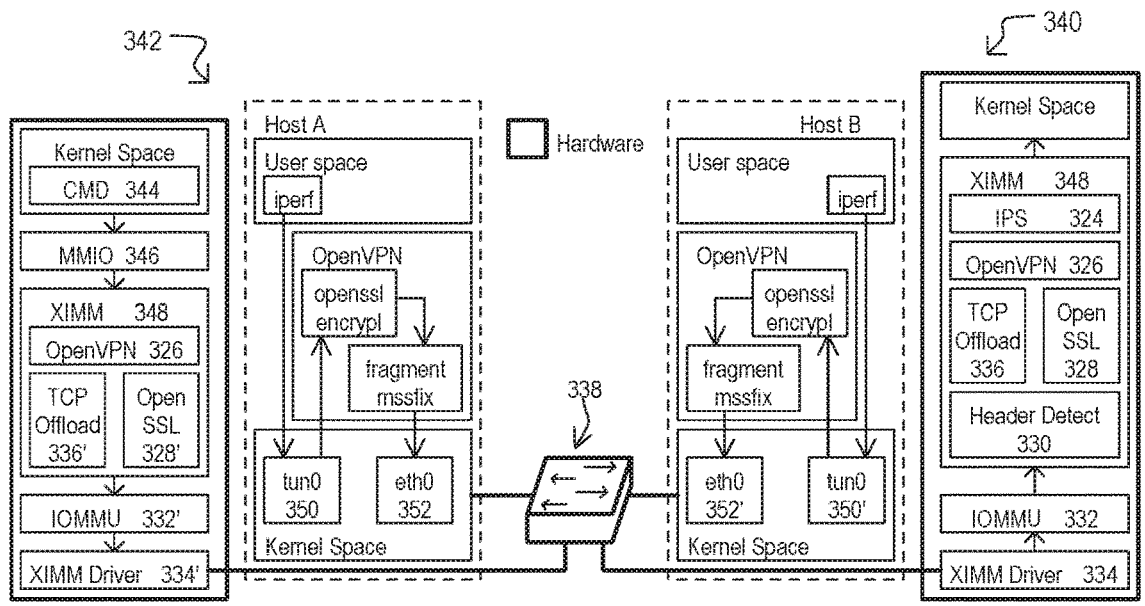

FIG. 3-1 illustrates exemplary software stacks respectively running on a XIMM and an x86-based server processor. A XIMM can include multiple offload processors, and each of the offload processors on the XIMMs can have an operating system such as Apache (300) which runs a stack of software for the packet handling services as described herein, or equivalents. One or more of the offload processors on the XIMM may be dedicated to arbitrating packets between the other offload processors, and may utilize a virtual switching software such as OpenFlow to do so (310). An arbitrating processor can also provide header services (308) by classifying packets by session identifier in preparation for packet-level applications such as signature detection and preprocessing. An arbitration processor can also manage VPN encryption and decryption services (302) using virtual private networking software such as OpenVPN. Input-output memory management software (e.g., IOMMU of 306) can be provided in order to facilitate safe sharing and usage of physical memory when the arbitration processor switches between virtual sessions for incoming packets. Direct memory access (e.g., R/DMA of 306) can allow for direct read/write to an internal memory of a XIMM. Queuing and reassembly functions (320) can take decrypted incoming fragments of data, assemble them into their original form and queue them for processing on one of multiple offload processors onboard the XIMM. Another software function can handle zero-overhead context switching (e.g., ZOCS of 304) in synergy with memory-mapped 10 (e.g., MMIO of 304). As packets belonging to different sessions ingress, the offload processors can rapidly switch contexts and read from different parts of memory in order to service them. MMIO and ZOCS can also be crucial in hardware accelerating the signature detection in the IPS portion of the Xockets stack, as the offload processors context switch between each of the input queues representing different signatures without incurring additional overhead. The VPN/IPS services layer (302) provides the algorithms for packet encryption and decryption, as well as signature detection for malicious packet traffic.

On the x86 server processor, an operating system is also present and can run database and analytics software (318, 322), such as a Hadoop and MySQL as but two possible examples. A software hypervisor such as SessionVisor may run as well, providing virtualization services to a plurality of guest OS sessions (312). The hypervisor is responsible for the provisioning of hardware resources to the guest sessions, and also runs virtual switching software such as OpenFlow for directing packets to their destination sessions. An x86 software stack can also include one or more software applications related to the XIMM. In the particular embodiment shown, two XIMM specific software applications are also present. A software application socket (314) facilitates communication between the CPU and the XIMM offload processors, and a NIC driver (316) provides Ethernet-over-DDR tunneling and packet transmission from the NIC to the XIMM.

FIG. 3-2 shows the software stacks described in FIG. 3-1 operating in the context of two servers (340, 342) communicating over an Ethernet-type connection (338). A packet is instantiated in the first server (342) and a kernel command (344) is given to send it through the software stack and over the network. Memory mapped input-output (346) (MMIO) is used to write the packet data into a XIMM on the first server (348), and a software stack prepares the packet for transmission using secure socket layer (SSL) VPN encryption. A VPN tunnel is established between the two servers (350) and the packet is transmitted from the first server's NIC (352) over the network (338). Upon receipt of the packet, the second server's NIC (352') forwards it to a XIMM by way of a custom driver (334). The input-output memory management unit (332) (IOMMU) determines which session the packet belongs to and passes it to the TCP offload stack (336) for header detection (330). An SSL service such as OpenSSL (328) decrypts the packet under the control of VPN software such as OpenVPN (326). An IPS software such as a Suricata (324) then performs signature detection on the packet in order to detect a possible threat, and upon clearance passes it to the kernel.

The following example(s) provide illustration and discussion of exemplary hardware and data processing systems suitable for implementation and operation of the foregoing discussed systems and methods. In particular, hardware and operation of wimpy cores or computational elements connected to a memory bus and mounted in DIMM or other conventional memory socket is discussed.

Figures 1, 4:
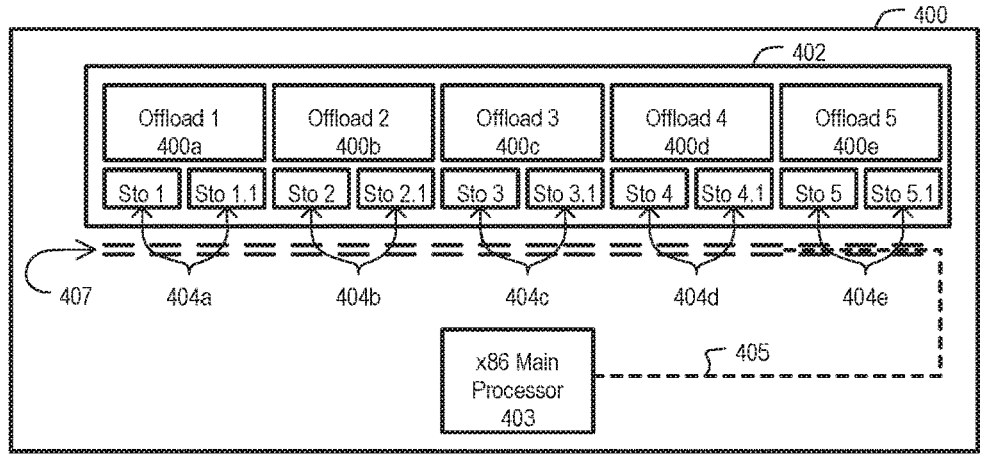
Figures 2, 4:
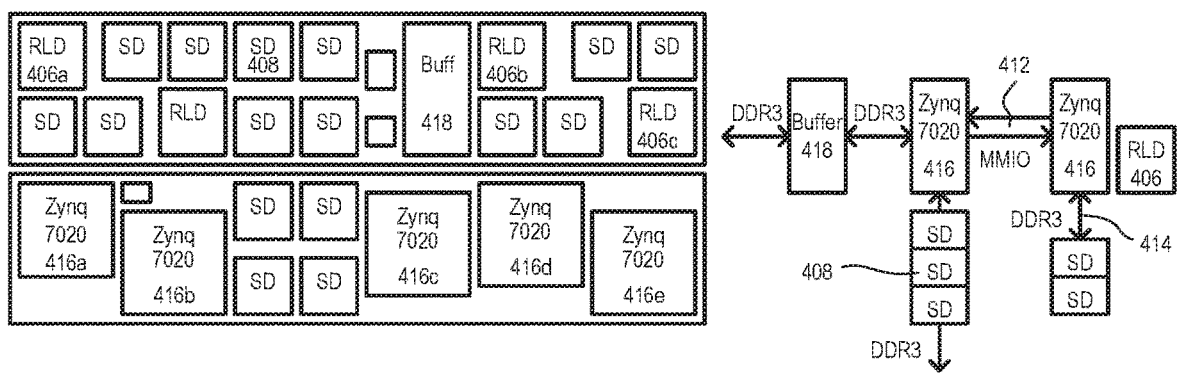

FIG. 4-1 is a cartoon schematically illustrating a data processing system 400 including a removable computation module 402 for offload of data processing from x86 or similar main/server processors 403 to memory bus 405 connected modules, as described herein or equivalents. Such modules 402 can be XIMM modules as described herein, or an equivalent, and can have multiple computation elements that can be referred to as "offload processors" because they offload various "light touch" processing tasks from the main processors (or x86 server), including but not limited to HTML, video, packet level services, security, or data analytics. This is of particular advantage for applications that require frequent random access or application context switching, since many server processors incur significant power usage or have data throughput limitations that can be greatly reduced by transfer of the computation to lower power and more memory efficient offload processors.

The computation elements or offload processors are accessible through memory bus 405. In this embodiment, the module can be inserted into a Dual Inline Memory Module (DIMM) slot on a commodity computer or server using a DIMM connector (407), providing a significant increase in effective computing power to system 400. The XIMM may communicate with other components in the commodity computer or server via one of a variety of busses including but not limited to any version of existing double data rate standards (e.g., DDR, DDR2, DDR3, etc.)

This illustrated embodiment of the XIMM contains five offload processors (400a, 400b, 400c, 400d, 400e) however other embodiments containing greater or fewer numbers of processors are contemplated. The offload processors can be custom manufactured or one of a variety of commodity processors including but not limited to field-programmable grid arrays (FPGA), microprocessors, reduced instruction set computers (RISC), microcontrollers or ARM processors. The computation elements or offload processors can include combinations of computational FPGAs such as those based on Altera, Xilinx (e.g., Artix class), or Zynq architecture (e.g., Zynq 7020), and/or conventional processors such as those based on Intel Atom or ARM architecture (e.g., ARM A9). For many applications, ARM processors having advanced memory handling features such as snoop control unit (SCU) are preferred, since this allows coherent read and write of memory. Other preferred advanced memory features can include processors that support an accelerator coherency port (ACP) that can allow for coherent supplementation of the cache through an FPGA fabric or computational element.

Each offload processor on the XIMM may run one of a variety of operating systems including but not limited to Apache or Linux. In addition, the offload processors may have access to a plurality of dedicated or shared storage methods. In this embodiment, each offload processor connects to two dedicated storage units (404a, 404b, 404c, 404d, 404e) which can be of a variety of storage types, including but not limited to random access memory (RAM), dynamic random access memory (DRAM), sequential access memory (SAM), static random access memory (SRAM), synchronous dynamic random access memory (SDRAM), reduced latency dynamic random access memory (RLDRAM), flash memory, or other emerging memory standards such as those based on DDR4 or hybrid memory cubes (HMC).

FIG. 4-2 shows an example layout of a XIMM module such as that described in FIG. 4-1, as well as a connectivity diagram between the components of the XIMM module. In this example, five Xilinx™ Zynq 7020 (416a, 416b, 416c, 416d, 416e) programmable systems-on-a-chip (SoC) are used as computational FPGAs/offload processors. These offload processors communicate with each other using memory-mapped input-output (MMIO) (412). The types of storage units used in this example are SDRAM (SD, one shown as 408) and RLDRAM (RLD, three shown as 406a, 406b, 406c) and an Inphi™ iMB02 memory buffer 418. Down conversion of 3.3 V to 2.5 volt is required to connect the RLDRAM with the Zynq components. The components are connected to the offload processors and to each other via a DDR3 (414) memory bus. Advantageously, the indicated layout maximizes memory resources availability without requiring a violation of the number of pins available under the DIMM standard.

In this embodiment, one of the Zynq computational FPGAs can act as arbiter providing a memory cache, giving an ability to have peer to peer sharing of data (via memcached or OMQ memory formalisms) between the other Zynq computational FPGAs. All traffic departing for the computational FPGAs is controlled through memory mapped I/O. The arbiter queues session data for use, and when a computational FPGA asks for address outside of the provided session, the arbiter is the first level of retrieval, external processing determination, and predictors set.

FIG. 4-3 shows two possible architectures for a XIMM in a simulation (Xockets MAX and MIN). Xockets MIN (420a) can be used in low-end public cloud servers, containing twenty ARM cores (420b) spread across fourteen DIMM slots in a commodity server which has two Opteron x86 processors and two network interface cards (NICs) (420c). This architecture provides a minimal benefit per Watt of power used. Xockets MAX (422a) contains eighty ARM cores (422b) across eight DIMM slots, in a server with two Opteron x86 processors and four NICs (422c). This architecture can provide a maximum benefit per Watt of power used.

FIG. 4-4 shows a representative power budget for an example of a XIMM according to a particular embodiment. Each component is listed (424a, 424b, 424c, 424d) along with its power profile. Average total and total wattages are also listed (426a, 426b). In total, especially for I/O packet processing with packet sizes on the order 1 KB in size, a low average power budget that is easily able to be provided by the 22 $V_{dd}$ pins per DIMM. Additionally, the expected thermal output can be handled by inexpensive conductive heat spreaders, without requiring additional convective, conductive, or thermoelectric cooling. In certain situations, digital thermometers can be implemented to dynamically reduce performance (and consequent heat generation) if needed.

Operation of one embodiment of a XIMM module 430 using an ARM A9 architecture is illustrated with respect to FIG. 4-5. Use of ARM A9 architecture in conjunction with an FPGA fabric and memory, in this case shown as reduced latency DRAM (RLDRAM), can simplify or makes possible zero-overhead context switching, memory compression and CPI, in part by allowing hardware context switching synchronized with network queuing. In this way, there is a one to one mapping between thread and queues. As illustrated, the ARM A9 architecture includes a Snoop Control Unit 432 (SCU). This unit allows one to read out and write in memory coherently. Additionally, the Accelerator Coherency Port 434 (ACP) allows for coherent supplementation of the cache throughout the FPGA 436. The RLDRAM 438 provides the auxiliary bandwidth to read and write the ping-pong cache supplement (435): Block1$ and Block2$ during packet-level meta-data processing.

The following table (Table 1) illustrates potential states that can exist in the scheduling of queues/threads to XIMM processors and memory such as illustrated in FIG. 4-5.

TABLE 1

| Queue/Thread State | HW treatment |
| --- | --- |
| Waiting for Ingress Packet | All ingress data has been processed and thread awaits further communication. |
| Waiting for MMIO | A functional call to MM hardware (such as HW encryption or transcoding) was made. |
| Waiting for Rate-limit | The thread's resource consumption exceeds limit, due to other connections idling. |
| Currently being processed | One of the ARM cores is already processing this thread, cannot schedule again. |
| Ready for Selection | The thread is ready for context selection. |

These states help coordinate the complex synchronization between processes, network traffic, and memory-mapped hardware. When a queue is selected by a traffic manager a pipeline coordinates swapping in the desired L2 cache (440), transferring the reassembled IO data into the memory space of the executing process. In certain cases, no packets are pending in the queue, but computation is still pending to service previous packets. Once this process makes a memory reference outside of the data swapped, a scheduler can require queued data from the network interface card (NIC) to continue scheduling the thread. To provide fair queuing to a process not having data, the maximum context size is assumed as data processed. In this way, a queue must be provisioned as the greater of computational resource and network bandwidth resource, for example, each as a ratio of an 800 MHz A9 and 3 Gbps of bandwidth. Given the lopsidedness of this ratio, the ARM core is generally indicated to be worthwhile for computation having many parallel sessions (such that the hardware's prefetching of session-specific data and TCP/reassembly offloads a large portion of the CPU load) and those requiring minimal general purpose processing of data.

Essentially zero-overhead context switching is also possible using XIMM modules as disclosed in FIG. 4-5. Because per packet processing has minimum state associated with it, and represents inherent engineered parallelism, minimal memory access is needed, aside from packet buffering. On the other hand, after packet reconstruction, the entire memory state of the session can be accessed, and so requires maximal memory utility. By using the time of packet-level processing to prefetch the next hardware scheduled application-level service context in two different processing passes, the memory can always be available for prefetching. Additionally, the FPGA 436 can hold a supplemental "ping-pong" cache (435) that is read and written with every context switch, while the other is in use. As previously noted, this is enabled in part by the SCU 432, which allows one to read out and write in memory coherently, and ACP 434 for coherent supplementation of the cache throughout the FPGA 436. The RLDRAM 438 provides for read and write to the ping-pong cache supplement (435): Block1$ and Block2$ during packet-level meta-data processing. In the embodiment shown, only locally terminating queues can prompt context switching.

In operation, metadata transport code can relieve a main or host processor from tasks including fragmentation and reassembly, and checksum and other metadata services (e.g., accounting, IPSec, SSL, Overlay, etc.). As IO data streams in and out, L1 cache 437 can be filled during packet processing. During a context switch, the lock-down portion of a translation lookaside buffer (TLB) of an L1 cache can be rewritten with the addresses corresponding to the new context. In one very particular implementation, the following four commands can be executed for the current memory space.

MRC p15,0,r0,c10,c0,0; read the lockdown register
BIC r0,r0,#1; clear preserve bit
MCR p15,0,r0,c10,c0,0; write to the lockdown register;
write to the old value to the memory mapped Block RAM Bandwidths and capacities of the memories can be precisely allocated to support context switching as well as applications such as Openflow processing, billing, accounting, and header filtering programs.

For additional performance improvements, the ACP 434 can be used not just for cache supplementation, but hardware functionality supplementation, in part by exploitation of the memory space allocation. An operand is written to memory and the new function called, through customizing specific Open Source libraries, so putting the thread to sleep and the hardware scheduler validates it for scheduling again once the results are ready. For example, OpenVPN uses the OpenSSL library, where the encrypt/decrypt functions can be memory mapped. Large blocks are then available to be exported without delay, or consuming the L2 cache 440, using the ACP. Hence, a minimum number of calls are needed within the processing window of a context switch, improving overall performance.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A server system, comprising:
a plurality of servers interconnected by a network, each server including a server processor configured to execute an operating system for the server, a computation module connected to the server processor by at least one bus, and configured to receive packets from the network, the computation module including first processing circuits configured to execute header detection on the received packets and classifying the received packets by session identifier, and at least decryption circuits implemented on programmable logic devices and configured to decrypt received packets; wherein the computation module executes header detection, classifying of packets and decryption of packets independent of the server processor.

2. The server system of claim 1, wherein the at least decryption circuits are compatible with at least one Advanced Encryption Standard (AES).

3. The server system of claim 1, wherein the first processing circuits also comprise programmable logic devices.

4. The server system of claim 3, wherein the programmable logic devices comprise field programmable gate array (FPGA) devices.

5. The server system of claim 1, wherein the first processing circuits comprise at least one offload processor that consumes less power than the server processor.

6. The server system of claim 1, wherein:
each server further includes
a bus connected to the server processor, and
the computation module comprises a circuit board that is
physically insertable into a socket, and the socket is connected to the bus.

7. The server system of claim 1, wherein each server further includes a network interface device.

8. The server system of claim 7, wherein the network interface device includes a network interface card.

9. The server system of claim 1, wherein each computation modules further includes second processing circuits mounted on the computation module and configured to execute signature detection on data packets decrypted by the second processing circuits.

10. The server system of claim 1, wherein the computation modules decrypt the data packets according to a virtual private network (vpn) encryption/decryption protocol.

11. A method, comprising:
receiving data packets at a plurality of servers interconnected by a network, each server including
a server processor configured to execute an operating system for the server, and
at least one computation module connected to the server processor by at least one bus;
by operation of first processing circuits on the at least one computation modules, executing header detection on received packets and classifying packets by session identifier; and by operation of at least decryption circuits implemented on programmable logic devices on the at least one computation modules, decrypting received packets; wherein the computation modules execute header detection, classifying of packets and decryption of packets independent of the server processor of their respective server.

12. The method of claim 11, wherein the at least decryption circuits are compatible with at least one Advanced Encryption Standard (AES).

13. The method of claim 11, wherein the first processing circuits comprise programmable logic devices.

14. The method of claim 13, wherein the programmable logic devices comprise field programmable gate array (FPGA) devices.

15. The method of claim 11, further including, within the computation modules, executing signature detection on the decrypted data packets with second processing circuits independent of any server processor.

16. The method of claim 11, further including, within each computation module, switching the received packets to the first processing circuits with a virtual switch formed by other processing circuits mounted on the computation module.

17. The method of claim 11, wherein decrypting the received packets is executed according to a virtual private network (vpn) encryption/decryption protocol.

18. A server system, comprising:
a plurality of servers interconnected by a network, each server including
a server processor configured to execute an operating system for the server,
at least one computation module, separate from the server processor and coupled to the server processor by at least one bus, the at least one computation module including
first processing circuits mounted on the computation module and configured to
execute header detection on packets received by the server,
classifying received packets by a session identifier, and
operate as a virtual switch to provide packets to circuits on the at least one computation module, and
at least decryption circuits implemented on programmable logic devices and configured to decrypt received packets; wherein
the computation modules execute header detection, classifying of packets, virtual switching of packets, and decryption of packets independent of the server processor of their respective server.

19. The server system of claim 18, wherein the first processing circuits comprise field programmable gate array (FPGA) devices.

20. The server system of claim 18, wherein the at least decryption circuits decrypt the received packets according to a virtual private network (vpn) encryption/decryption protocol.

* * * * *